Sept. 25, 1951 W. J. VAN HEUVEL ET AL 2,569,120
PRESSURE TIRE GAUGE
Filed Nov. 8, 1948
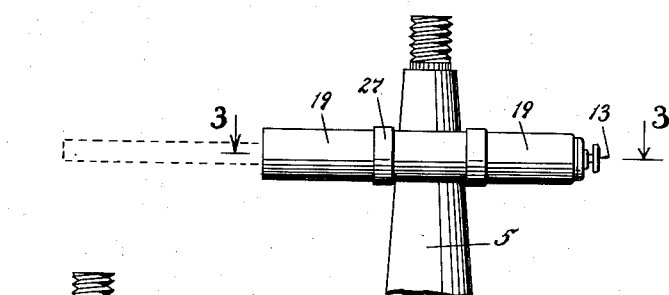
Fig.1
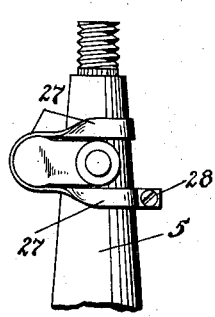
Fig.2
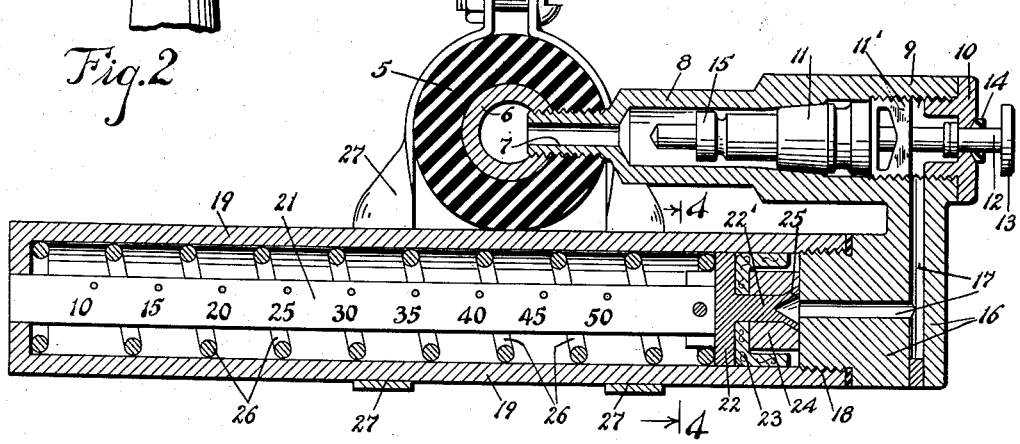
Fig.3
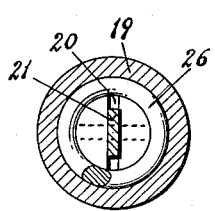
Fig.4
INVENTORS,
Walter J. Van Heuvel
Marie K. Van Heuvel
ATTORNEY.

Patented Sept. 25, 1951

2,569,120

UNITED STATES PATENT OFFICE 2,569,120

PRESSURE TIRE GAUGE

Walter J. Van Heuvel and Marie K. Van Heuvel, Azusa, Calif.

Application November 8, 1948, Serial No. 58,988

2 Claims. (Cl. 73—390)

This invention relates to pressure tire gauges, and more particularly to a pressure tire gauge which can be connected with the valve stem of a tire permanently for the purpose of indicating at all times the pressure in the tire without the necessity of taking of a portable tire gauge for this purpose;

Among the salient objects of this invention are: to provide a pressure tire gauge which can be connected through the present valve tube of a tire, independently of the regular valve through which the tire is supplied with air, and which can be manipulated by hand to permit the air pressure in the tire to enter the gauge portion of the device for indicating the pressure in the tire; to provide such a pressure tire gauge which is complete in itself and only needs to have the end of its valve part connected through the side of the regular valve tube of a tire, below the regular valve therein, said valve part having a plunger in its end which can be pressed inwardly to open communication from the tire to the gauge part of the invention for the purpose of indicating the pressure in the tire.

Other advantages will be apparent from the following more detailed description of one practical embodiment of our invention, taken with the accompanying sheet of drawings, in which:

Figure 1 is a side view of a regular tire tube with our invention connected therewith;

Figure 2 is a similar view thereof from a position at right angles to Fig. 1;

Figure 3 is an enlarged, sectional view taken on the line 3—3 of Fig. 1, showing the construction and arrangement of the parts of the invention, the valve tube of the tire being in section; and Figure 4 is a cross sectional view on line 4—4 of Fig. 3.

Referring now in detail to the drawings, 5 represents a valve tube, such as is connected with all tires for filling the tire with air. This is shown in enlarged sectional view in Fig. 3, in order to show how the invention is connected therewith.

Within said valve tube there is the usual metal tube 6, and our invention is connected therewith by boring a hole through said valve tube 5 and said metal tube 6, as seen in Fig. 3, and threading the end 7 of a valve body 8 thereinto as shown, said valve body being internally threaded in its outer end, as at 9, and provided with a closure cap 10, as shown. The valve proper, designated as a whole 11, is the same as that used in the regular valve body 5, except that the valve stem or plunger 12 is provided with a handle or head 13 on its outer end, with gasket 14 therearound, and on its inner end said stem is provided with a valve ring 15, which closes the end of the valve body 11, as shown. Said valve body 11 has at its outer end a flat portion, 11', threaded on its opposite edges, as shown, to be conveniently screwed into and removed from the valve body 11, as are the regular valves in the usual tire tubes, as 5.

The valve body 8, at its outer end, has an angle portion 16, with an air passage therethrough from the valve body 8, said air passage being designated 17, as shown.

The end of said angle portion is threaded, as at 18, to receive a tubular member 19, closed at its outer end, except for a slot opening, as 20, to receive the end of a flat bar or gauge 21, the inner end of which is secured to a piston member 22, provided with a gasket 23 and a block 24, as shown, with its stem portion 22' flared as at 25, and in alinement with the air passageway 17, as clearly shown in Fig. 3. A coiled spring 26 is around said flat bar or gauge 21, within said tubular member 19, with one end against the closed end of said tubular member 19 and its other end against the piston member 22, as shown, so that when air pressure is admitted through the air passageway 17, said piston member 22 and said flat bar or gauge 21 is moved out through the closed end of said tubular member 19 to indicate the amount of pressure, which is indicated by the graduations shown on said gauge member.

Said gauge mechanism, constituting the invention, is also secured to the regular air valve tube 5 by means of a band 27, around said tube 5 and then around the tubular member 19 and again around said tube, with its two ends connected by means of a bolt 28, as clearly indicated in Figs. 1, 2 and 3. This constitutes one method of securing the invention to the present air tube valve 5, as shown. It will be understood, of course, that the invention proper could be made as a part of the tire tube and secured in other ways, and we do not, therefore, limit our invention to the details of construction and arrangement shown for explanatory purposes, except as we may be limited by the hereto appended claims.

We claim:

1. The combination with the regular valve tube of a tire with its valve: of a permanently attached pressure gauge which includes a short body portion having one end connected through the side of said valve tube below its valve, and extended transversely therefrom, said pressure gauge also having a longer body portion parallel with said short body portion, and extended transversely along side of said regular valve tube and supported thereby, a pressure-moved gauge element associated therewith and having graduations thereon, and a control valve in said short body portion, at the juncture thereof with said longer body portion, and extended axially from said short body portion and manually operable to admit air from the tire to said pressure gauge.

2. The combination with the regular valve tube of a tire with its spring-closed valve therein: of a permanently attached pressure gauge including a short body portion and a longer body portion connected together in parallel relationship, a control valve axially in said short body portion and extended therefrom for manual operation to open communication between said body portions, said longer body portion having a graduated gauge element operable therein by air pressure from said short body portion, said short body portion having one end connected through the side of said regular valve tube to receive air pressure from said tire, and means supporting said pressure gauge on said regular valve tube.

WALTER J. VAN HEUVEL.
MARIE K. VAN HEUVEL.

REFERENCES CITED

The following references are of record in the file of this patent:

UNITED STATES PATENTS

| Number | Name | Date |
|---|---|---|
| 500,944 | Pickel | July 4, 1893 |
| 1,129,450 | Campbell | Feb. 23, 1915 |
| 1,503,068 | Sladek | July 29, 1924 |
| 2,278,776 | Fowler | Apr. 7, 1942 |

FOREIGN PATENTS

| Number | Country | Date |
|---|---|---|
| 37,931 | France | Nov. 9, 1930 |
| (addition to No. 692,408) | | |